United States Patent
Weimper et al.

(10) Patent No.: US 6,757,594 B2
(45) Date of Patent: Jun. 29, 2004

(54) IN-CAR COMPUTING SYSTEM AND METHOD FOR CONTROLLING A SELECTION MARK IN AN IN-CAR COMPUTING SYSTEM

(75) Inventors: Andreas Weimper, Filderstadt (DE); Peter Rössger, Filderstadt (DE)

(73) Assignee: CAA AG, Filderstadt (DE)

( * ) Notice: Subject to any disclaimer, the term of this patent is extended or adjusted under 35 U.S.C. 154(b) by 0 days.

(21) Appl. No.: 10/146,250

(22) Filed: May 15, 2002

(65) Prior Publication Data

US 2003/0074112 A1 Apr. 17, 2003

(30) Foreign Application Priority Data

May 18, 2001 (DE) ......................................... 101 24 237

(51) Int. Cl.[7] ................................................. G06F 7/00
(52) U.S. Cl. ......................................................... 701/1
(58) Field of Search .............................. 701/1, 24, 36, 701/211

(56) References Cited

U.S. PATENT DOCUMENTS

| | | | |
|---|---|---|---|
| 5,031,104 A | * | 7/1991 | Ikeda et al. ................. 701/209 |
| 5,270,689 A | | 12/1993 | Hermann |
| 6,023,701 A | | 2/2000 | Malik et al. |
| 6,405,126 B1 | * | 6/2002 | Palomo et al. ............... 701/202 |

* cited by examiner

*Primary Examiner*—Yonel Beaulieu
(74) *Attorney, Agent, or Firm*—Harness, Dickey & Pierce, P.L.C.

(57) ABSTRACT

A vehicle computing system with a monitor (24) that displays selection menus (40), information with hypertext-linked words (50) (Hyperlinks) and a selection market (47) (Cursor), a rotary-/push button (26,27), and a cursor control device (18) which moves the cursor (47) per the control signals of the rotary-/push buttons (26,27). The cursor control device (18) includes a hyperlink detection unit (20), which in a first operating mode (Link-Mode) recognizes the displayed hyperlinks (50) on the monitor and moves the cursor (47) via operation of the rotary-/push buttons (26,27) from one hyperlink (50) to the next. The hyperlink detection unit (20) generates an additional hyperlink (52) that is independent of the displayed information, the selection of which enables a switch to a second operating mode. A method of controlling a selection marker in the above-described vehicle computing system is also disclosed.

7 Claims, 2 Drawing Sheets

IN-CAR COMPUTING SYSTEM AND METHOD FOR CONTROLLING A SELECTION MARK IN AN IN-CAR COMPUTING SYSTEM

The present invention relates to an in-car computing system comprising a display screen for displaying selection menus, information containing hyperlinks and a selection mark (cursor), a rotary-/push button switch, and a cursor control device adapted to move the cursor on the display screen in response to control signals from the rotary-/push button switch. The invention further relates to a method for controlling a selection mark in an in-car computing system.

In-car computing systems are employed in vehicles to an increasing extent. The applicant offers for example such an in-car computing system under the name "CarPC". Several systems which have been realized separately in the past, for example navigation system, radio, etc., will be bundled up by using the in-car computing system. To operate the in-car computing system, so-called rotary-/push button switches are used, wherein the rotary switch serves to select a function and the push button switch serves to activate it.

Presently, also a so-called browser is integrated in an in-car computing system for displaying Internet and/or WAP contents. An advantageous specific feature of Internet contents is the possibility to reach fastly other related contents by using so-called hyperlinks. In a stationary PC the selection and activation of these hyperlinks is readily possible by moving a PC mouse and, hence, the cursor two-dimensionally in. An implementation of this concept in a vehicle would require a respective operating device which allows a two-dimensional movement of the cursor.

Due to ergonomic reasons, such a two-dimensional operating device, for example a crossed four-way switch, is not advantageous. Particularly, positioning the cursor on a hyperlink is hardly possible during a drive due to vibrations. Moreover, existing systems with rotary-/push button switches may not be upgraded with the browser function.

From DE 199 44 324 A1, a multifunction operating device for installation in a vehicle is known. It comprises a rotary switch for selecting functions, which will be displayed within a display area on a display screen, the multifunction operating device comprising a combination of a rotary switch and several push button switches. The push button switches are arranged around the rotary switch and are designed such that they may be distinguished haptically. The arrangement of the display fields associated with the push button switches on the display screen corresponds at least to the arrangement of the push button switches.

The disadvantage of this multifunction operating device is that a plurality of push button switches are required in addition to the classical rotary switch.

From U.S. Pat. No. 6,023,701, a method for a computing system is known which allows to extract hyperlinks from an Internet page without displaying these Internet pages on the computer screen.

In view of the above, the object of the present invention is to provide an in-car computing system which allows the integration of a browser function despite the use of a rotary-/push button switch and without the necessity of additional push button switches.

In the in-car computing system of the afore-mentioned kind, this object is solved such that the cursor control device comprises a hyperlink detection unit which in a first operation mode (link mode) detects the hyperlinks displayed on the display screen and moves the cursor from one hyperlink to the next when operating the rotary-/push button switch, and the hyperlink detecting unit generates a hyperlink ("menu") independent of the information displayed, the selection of the hyperlink allows switching in a second operation mode (menu-mode).

I.e. with other words, that the in-car computing system scans the browser contents on the display screen for hyperlinks and detects their position on the screen. The in-car computing system extracts with other words the hyperlinks from the displayed Internet contents and creates a list containing the associated screen coordinates. Operation of the rotary switch causes the cursor to move from one hyperlink position to the next, regardless where the hyperlink is displayed on the screen. As soon as the user reaches the desired hyperlink, he may request the respective contents by pushing the push button switch. By creating an additional hyperlink, it is allowed to switch to another operation mode by selecting this hyperlink without the necessity of providing a further operating device.

Hence, the afore-mentioned measures result in the advantage that the user may use a simple one-dimensional rotary switch for navigation, although the cursor itself is actually moved two-dimensionally. A significantly simplified operation may be achieved compared with two-dimensional operating devices, like crossed four-way switches, etc. Moreover, a hard key which was necessary to switch in the menu mode, may be abandoned. The hyperlink generated by the hyperlink detecting unit and not being part of the displayed Internet page may be selected and activated by rotating the rotary-/push button switch.

A further advantage is that existing in-car computing systems employing the mentioned rotary-/push button switch may be upgraded with a browser function.

In a preferred embodiment, the in-car computing system is arranged such that when switching from the menu mode to the link mode, a selection menu displayed on the display screen drives out of the screen, and when switching from the link mode to the menu mode, it drives into the screen.

This has the advantage that the selection menu does not obstruct the display of information on the screen. However, in order to inform the user in the link mode about those selection items which are contained in the selection menu, it is preferred to display a symbol, particularly a letter or a picture, for each menu item of the selection menu. This display requires significantly less space and, hence, obstructs the display of information slightly. Nevertheless, the user has always the possibility by means of the displayed symbols to inform himself about the existing menu items.

The object underlying the present invention is also solved by a method for controlling a selection mark in an in-car computing system such that in a first operation mode (link mode) the hyperlinks displayed on the screen are detected and the cursor is moved from one hyperlink to the next when actuating the rotary-/push button switch to allow the selection of one of the hyperlinks, wherein in the link mode an additional hyperlink is displayed on the display screen, which is selectable by actuating the rotary-/push button switch and allows switching from the link mode into the menu mode.

As already set forth in connection with the in-car computing system according to the present invention, the advantage of the method according to the present invention is that by using a simple rotary-/push button switch, a navigation within an Internet or WAP page is possible. Further, the advantages mentioned above are also achieved by this method.

It is preferred that the selection menu drives out of the display screen when switching to the link mode and drives into the screen when switching to the other mode. It is further preferred to display a symbol at the screen margin for each menu item of the selection menu, the activated menu item being highlighted, preferably by color.

This measure results in an improved ergonomic operation of the in-car computing system. Further advantages and embodiments of the present invention will be apparent from the description and the enclosed drawings.

It is to be understood that the features mentioned above and those yet to be explained below can be used not only in the respective combinations indicated, but also in other combinations or in isolation, without leaving the scope of the present invention.

The invention will now be explained by way of an embodiment with reference to the drawings in more detail. In the drawings.

Figure 1:
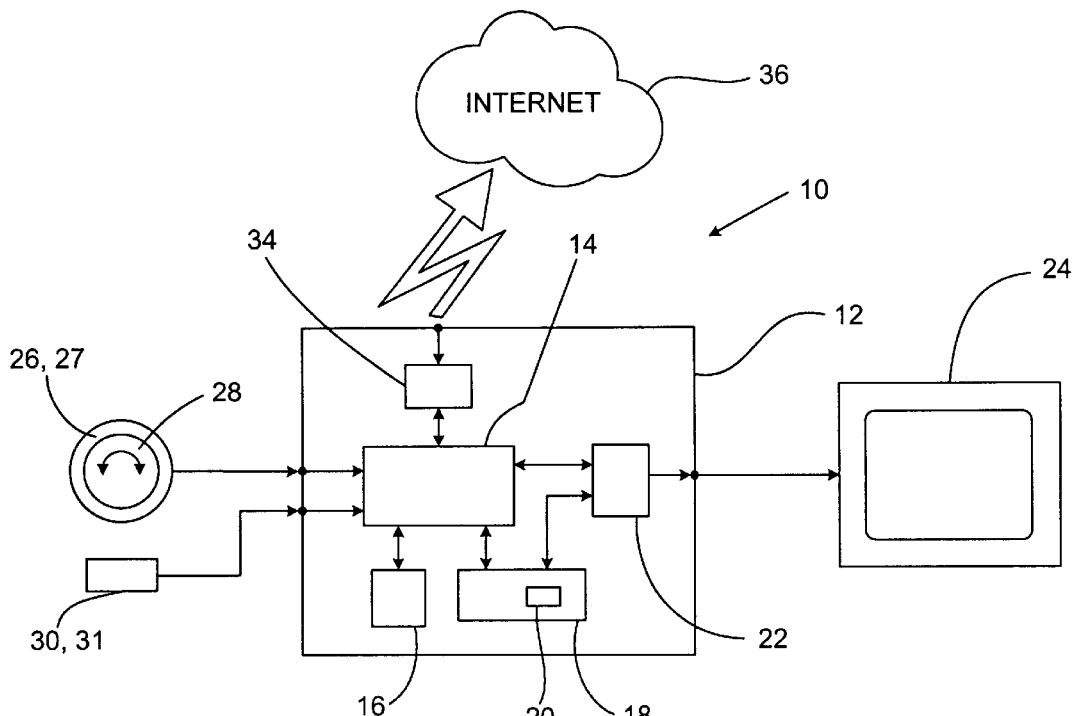
FIG. 1 shows a schematic block diagram of an in-car computing system.

In FIG. 1, an in-car computing system is shown in the form of a block diagram and is indicated with reference numeral 10. The in-car computing system 10 comprises an in-car computer 12, which is made of standard components of a personal computer. Such components comprise, for example, microprocessors, memory, hard disk, interfaces, etc.

These functional components of the in-car computer 12 are shown in present FIG. 1. The in-car computer 12 comprises for example a computer unit 14, which, among other things, serves to manage data and to run the software programs. A memory unit 16, which may be comprised of different memory media, for example RAM, EPROM, hard disk memory, etc., communicates with the computer unit 14. The memory unit 16 serves to store program code (software) as well as temporary data.

A cursor control device 18, which comprises a hyperlink detection unit 20, communicates with the computer unit 14.

The cursor control device 18 communicates with a display screen driver unit 22, which may further receive also data from the computer unit 14.

The driver unit 22 serves to display particular contents on the display screen 24.

For operating the in-car computer 12, the in-car computing system 10 comprises an operating element 26 which is provided in the form of a so-called rotary-/push button switch 27 in the present embodiment. This rotary-/push button switch 27 allows a rotation in the direction of the arrows 28 on the one hand side and allows to be pushed perpendicular to the drawing plane for confirming a selection on the other hand side. Such a switch element is already employed in vehicles for navigation systems nowadays.

The in-car computing system 10 further comprises a further operating element 30 provided as a push button 31. Both operating elements 26, 30 supply respective signals to the computer unit 14, wherein the operating element 26 supplies two different signals in total, namely a signal generated by the rotary switch and a signal generated by the push button.

The in-car computer 12 comprises an input/output unit 34 (I/O-unit), which allows a connection with the Internet 36, for example via a mobile radio system (GMS, GPRS, UMTS). The control of the I/O-unit 34 is performed by the computer unit 14.

The in-car computing system 10 is the central control console for a plurality of different communication services in a vehicle and a navigation system, a telephone system or an Internet browser are examples for such services. For the sake of clarity, those components necessary for a navigation system or a telephone system are not shown in FIG. 1.

Figure 2:
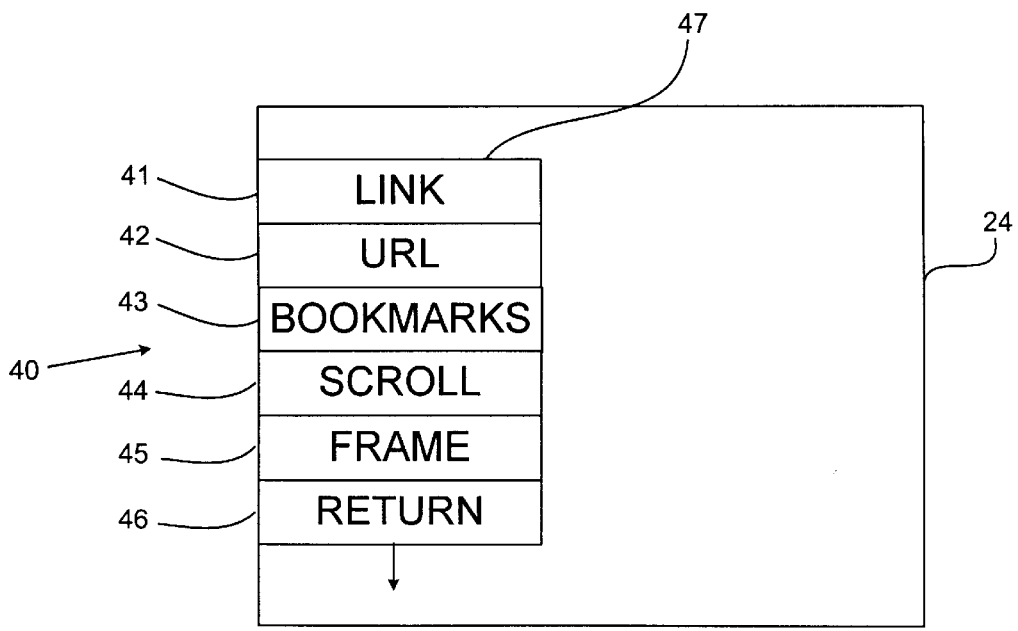
FIG. 2 shows schematically a screen contents of the in-car computing system.

For the selection and operation of the different functions of the in-car computing system, a selection menu is displayed the user on the display screen 24. Such a selection menu is shown in FIG. 2 and referenced with reference numeral 40. This selection menu 40 is created by the computer unit 14 and is supplied via the driver unit 22 to the display screen 24.

Merely as an example, six menu items are shown in the present embodiment which are necessary for operating an Internet browser. Of course, further menu items may be provided.

The first menu item 41, which is called "link", serves to change into the link mode which will be described below. The menu item "URL" 42 allows to activate the input of Internet addresses, the menu item "bookmarks" 43 allows to display a list of stored bookmarks which may be selected. For scrolling within the contents displayed on the display screen 24, the menu item "scroll" 44 is provided, whereas the menu item "frame" 45 allows to change between Internet frames displayed on the screen. Finally, a menu item "back" 46 is provided which allows a change into the next higher menu level.

The selection and activation of the afore-mentioned menu items 41 to 46 is made by means of the rotary-/push button switch 27, wherein a rotation of the rotary switch moves a selection mark 47 from one menu item to the next. The activation of the selected menu item is made by pushing the push button switch 27.

Figures 3A, 3B:
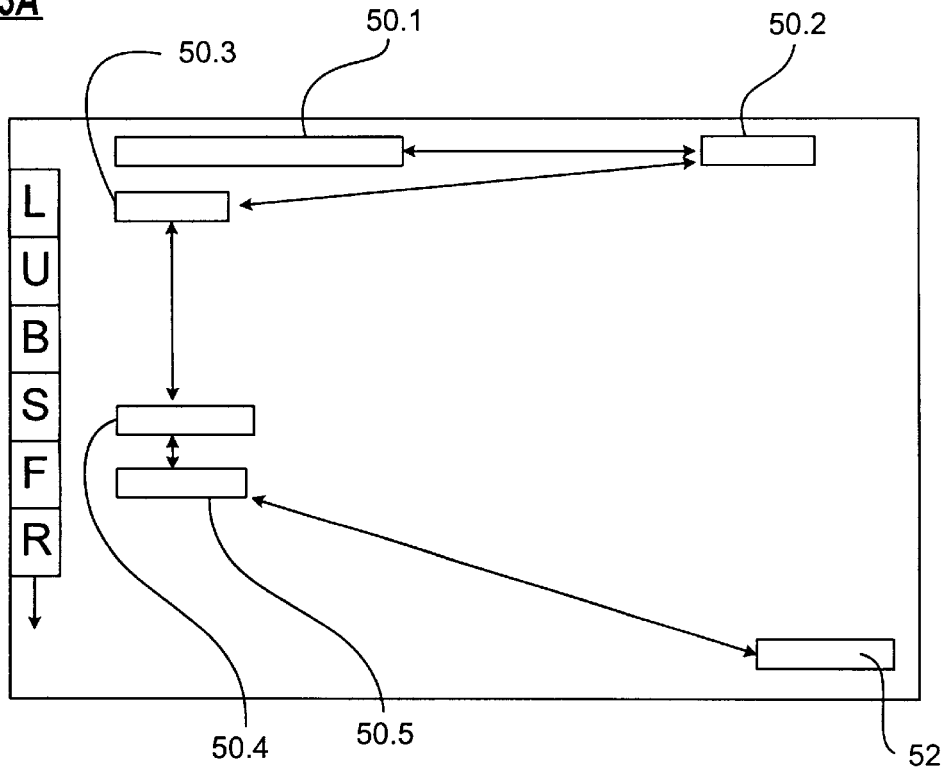
FIG. 3A shows a schematic view of an Internet content.
FIG. 3B shows a representation of the Internet content shown in FIG. 3B and reduced to the hyperlinks contained therein for explaining the method according to the present invention.

In the illustration of the selection menu 40 shown in FIG. 2, the computer unit 14 is in the menu mode. If, for example, the first menu item 41 is activated, the computer unit 14 switches into the afore-mentioned link mode. In order to have space on the display screen 24 as much as possible for displaying an Internet page, the selection menu drives out of the screen until only one letter can be seen, namely the first letter of the respective menu item. This is shown in FIG. 3A. Here, the selection menu 40 is in terms of width reduced to one letter. It is to be understood that not only letters but also graphical symbols may be displayed which provide the user with optical information about the respective menu item.

If it is changed into the link mode by selecting the menu item 41, an Internet page and a WAP page, respectively, is displayed on the display screen 24 with the respective Internet contents. The particularity of such Internet pages (pages in the html-format) is that hyperlinks may be displayed which allows to change very quickly to other Internet pages. In FIG. 3A, some hyperlinks are exemplary shown and indicated by underlines.

In ordinary personal computers, the selection of such hyperlinks is made by using the keyboard or by moving a cursor with the help of a computer mouse being movable two-dimensionally. Therewith, the cursor may be brought into each position on the display screen 24.

Such a control of the cursor is, however, not possible in an in-car computing system with a rotary-/push button switch 27 in the present case, because the operating element 26 only allows the movement of the cursor in one direction. However, in order to be able to select the hyperlinks on the display screen 24, the hyperlink detection unit 20 of the cursor control device 18 scans the contents displayed on the screen and detects the displayed hyperlinks and their position on the screen. This information is, for example, stored in the form of a list, and serves the cursor control device 18 to move the cursor and the selection mark, respectively.

In FIG. 3B, the result of the analysis of the Internet page of FIG. 3A is shown schematically, wherein the hyperlinks are indicated in the form of boxes 50. Here, it is to be noted that this representation only serves for explaining the method. After switching from the menu mode into the link mode and the afore-mentioned analysis of the Internet contents on the screen 24 by the hyperlink detection unit 20, the cursor control device 18 moves the cursor on the first upper hyperlink 50.1. If the user now turns the rotary switch 27 clockwise, the respective signals supplied to the computer unit 14 causes the cursor control device 18 to move the selection mark to the next hyperlink 50.2 in the hyperlink list previously created. Further turning of the rotary switch 27 moves the cursor to the hyperlink 50.3, then to the hyperlink 50.4 and finally to the hyperlink 50.5, as indicated by arrows. When the user has reached the desired hyperlink with the cursor, he is then able to activate it by pushing the rotary-/push button switch 27, with the result that a new Internet page is requested via the Internet 36 and is then displayed on the display screen 24. For this new Internet page, an analysis and detection of hyperlinks is again performed which are then selectable by operating the rotary/push button switch 27.

As it is shown in FIG. 3B, the hyperlinks 50 are located at most different positions on the screen 24. Nevertheless it is possible to select each of these hyperlinks 50 by operating a one-dimensional operating element.

As to return to the menu mode again, the user has to push the operating element 30. This has the result that the selection menu 40 slowly drives in the picture until the presentation shown in FIG. 2 is achieved.

Alternatively to the operation of the operating element 30, it is preferably possible to create an own hyperlink independent of the Internet contents and to display it on a predetermined position on the screen. This own hyperlink is referenced with reference numeral 52 in FIG. 3B and is indicated with "MENU" in FIG. 3A. This own hyperlink 52 is added to the list of detected Internet hyperlinks and may be selected by turning the rotary switch 27. Activating this hyperlink 52 allows to switch back in the menu mode and does not result in the display of a new Internet page as it is the case with the afore-mentioned hyperlinks 50.

With the help of this approach, it is possible to do without the operating element 30, so that the mechanical and space requirements for the in-car computing system 10 may be reduced. Of course, further own hyperlinks may be created in addition to the hyperlink "MENU" as to provide additional functions, for example scrolling (up, down), for a fast access.

To sum up, the hyperlink detection unit allows the use of a one-dimensional control element (rotary switch), for the selection of hyperlinks within an Internet page. A two-dimensional operating element, such as a crossed four-way switch, a joystick, etc., is, hence, dispensable with the result that already existing systems may be upgraded and the integration of a browser function does not mean additional constructional efforts compared with present systems.

What is claimed is:

1. In-car computing system comprising:
a display screen for displaying selection menus, information containing hyperlinks and a selection mark (cursor),
a rotary-/push button switch, and
a cursor control device adapted to move the cursor on the display screen in response to control signals from the rotary-/push button switch, wherein said cursor control device (18) comprises a hyperlink detecting unit (20), which in a first operation mode (link mode) detects the hyperlinks (50) displayed on the display screen and moves said cursor (47) from one hyperlink to the next when operating said rotary-/push button switch (26, 27), and said hyperlink detection unit (20) generates a hyperlink (52) ("menu") independent of the information displayed, the selection of said hyperlink (52) allows switching in a second operation mode (menu-mode).

2. The in-car computing system of claim 1, characterized in that a selection menu (40) displayed on the display screen drives out of the screen when switching from the menu mode to the link mode, and drives into the screen when switching from the link mode to the menu mode.

3. The in-car computing system of claim 2, characterized in that a symbol is displayed for each menu item of the selection menu in the link mode.

4. Method for controlling a selection mark in an in-car computing system, which comprises
a display screen (24) for displaying selection menus (40), information containing hyperlinks and a selection mark (cursor),
a rotary-/push button switch (27), and
a cursor control device (18), which moves said cursor on the display screen in response to control signals from said rotary-/push button switch, wherein in a first operation mode (link mode) said hyperlinks displayed on the screen (24) are detected and said cursor (47) is moved from one hyperlink to the next when actuating said rotary-/push button switch (26) to allow the selection of one of said hyperlinks, wherein in said link mode an additional hyperlink (52) is displayed on the display screen, which allows its selection by actuating said rotary-/push button switch and allows a switching from said link mode in said menu mode.

5. Method of claim 4, characterized in that when switching to said link mode said selection menu drives out of said display screen (24) and drives into said screen when switching to the other mode.

6. Method of claim 5, characterized in that in the link mode a symbol is displayed at the screen margin for each menu item of the selection menu (40), the activated menu item being highlighted.

7. Method of any of claims 4 through 6, characterized in that said selection menu (40) contains at least one of the following menu items (41–46): link, back, forward, cancel, update, starting page, bookmarks, progression, URL input, font size larger/smaller, scroll up/down, scroll left/right, offline connection termination, frame selection, area or frame, temporary internet files, setting progression.

* * * * *